United States Patent [19]

Pribysh

[11] Patent Number: 5,582,662
[45] Date of Patent: Dec. 10, 1996

[54] VEHICLE WHEEL ANTI-SLIP DEVICE

[76] Inventor: Yakov Pribysh, 117-02 Park La. South, Apt. C3C, Kew Gardens, N.Y. 11418

[21] Appl. No.: 387,487

[22] Filed: Feb. 13, 1995

[51] Int. Cl.$^6$ .......................... B60C 27/20; B60C 27/10; B60C 27/14
[52] U.S. Cl. .................. 152/216; 152/213 A; 152/218; 152/225 R
[58] Field of Search .................. 152/208, 213 R, 152/213 A, 214, 216, 218, 221, 225 R, 225 C, 226

[56] References Cited

U.S. PATENT DOCUMENTS

| | | | |
|---|---|---|---|
| 1,600,276 | 9/1926 | Dombowsky | 152/218 |
| 1,769,307 | 7/1930 | Price | 152/225 R |
| 2,477,051 | 7/1949 | Eisenhauer, Sr. | 152/225 R |
| 2,601,882 | 7/1952 | Eisenhauer | 152/225 R |
| 2,767,761 | 10/1956 | O'Higgins | 152/218 |
| 2,806,503 | 9/1957 | Hamerski | 152/225 R |
| 2,873,783 | 2/1959 | O'Higgins | 152/218 |
| 2,910,105 | 10/1959 | Binegar | 152/225 R |
| 3,016,079 | 1/1962 | Weller | 152/218 |
| 3,079,972 | 3/1963 | Forman | 152/213 R |
| 3,249,143 | 5/1966 | Scott | 152/225 R |
| 3,732,910 | 5/1973 | Mathews | 152/225 R |
| 3,753,456 | 8/1973 | Saunders | 152/225 R |
| 3,918,504 | 11/1975 | Prokesch | 152/225 R |
| 3,996,984 | 12/1976 | Mezzacapo | 152/225 R |
| 4,089,359 | 5/1978 | Jones | 152/216 |
| 4,735,248 | 4/1988 | Cizaire | 152/213 A |
| 4,862,936 | 9/1989 | McDonough | 152/216 |
| 5,012,848 | 5/1991 | Metraux | 152/218 |

Primary Examiner—Michael W. Ball
Assistant Examiner—Francis J. Lorin
Attorney, Agent, or Firm—Armstrong, Westerman, Hattori, McLeland & Naughton

[57] ABSTRACT

A vehicle wheel anti-slip device which is removably mountable on a vehicle for adding traction in snow, ice, etc. The device includes a frame having a generally rigid polygonal shape, a plurality of ground engaging claws including a first leg portion locatable over the perimeter of the vehicle wheel and a second leg portion and at an angle to the first leg portion and locatable over the front side of the vehicle wheel. The device also includes a plurality of support brackets which are pivotally mounted on the frame, and the claws are each pivotally mounted to a respective one of the support brackets. In addition, a tension force device including a tension spring and chords connected to each of the support brackets biases the plurality of claws simultaneously generally towards the center axis of the tire so as to be pressed thereagainst. In addition, a tension spring member connects each of the support brackets with a respective one of the claws on the second leg portions such that the claws are biased so as to pivot in a direction towards the center axis when mounted upon the vehicle wheel. A respective stop member limits the pivotal movement of the claws with respect to the respective support bracket. The present invention, therefore, has significant advantages, such as (1) it is very durable and reliable, (2) it can be very easily installed, and (3) it can have universal applicability to various wheels.

15 Claims, 4 Drawing Sheets

5,582,662

VEHICLE WHEEL ANTI-SLIP DEVICE

BACKGROUND OF THE INVENTION

This invention relates generally to traction devices for vehicle wheels, e.g. for automobiles, jeeps, vans, trucks, plows, three wheel vehicles, two wheel vehicles, etc. More specifically, this invention relates to an anti-slip device which is attached to a vehicle wheel in order to enhance wheel to ground contact in inclement weather conditions, e.g. snow, ice, etc.

Under certain whether conditions, normal vehicle wheels do not provide sufficient ground engagement, such normal vehicle wheels usually being constructed from a resilient material, such as rubber, having treads therein and sometimes having metal studs, etc., to enhance friction in certain environments.

A. The Related Art and Problems Therein

In the past, it has been known to apply chains to vehicle wheels in order to enhance friction contact on slippery roads, such as on ice or snow. However, such chains can be difficult to place upon a wheel, can be somewhat unstable upon the wheel, and can rattle, etc., during use causing noise and/or possible damage due to linkage wear, etc. In addition, such chains are usually somewhat difficult to place upon the wheel—e.g. requiring the wheel to be lifted or to be rotated over the chains.

There have also been a number of anti-skid devices which are attachable to a vehicle wheel and which include a number of cleat-like members crossing the tire tread of the wheel. Examples of such anti-skid devices include: (1) U.S. Pat. No. 4,862,936, (2) U.S. Pat. No. 4,089,359, (3) U.S. Pat. No. 3,016,079, (4) U.S. Pat. No. 2,873,783, and (5) U.S. Pat. No. 2,767,761.

However, the present inventor has discovered that the existing devices have a variety of problems. A number of such problems with these existing devices can be seen with respect to U.S. Pat. No. 4,089,359, number (2) above, which shows an anti-skid device having a number of cleats 14 which are biased inwardly via a spring.

First, in this latter type of device, the sliding motion of the cleats 14 is generally perpendicular to the vertical load from the wheel, e.g. generally axially into the cylindrical member 35. Accordingly, the cleats must be maintained straight in order to enable proper axial movement within the guides. However, the sliding motion of the cleats takes place generally perpendicular to a generally horizontal load imparted to the cleats from the wheel's rotational movement, or moment, against the ground, e.g. snow, therebelow. In addition, because the cleats move along a single 'axis', any forces acting upon the cleats which are not directly along that axis could cause a potentially damaging moment force. As a result, a significant warpage and/or deformation can occur in the cleats and/or the guides. This can easily hamper the sliding motion and can even cause sliding within the guides to become impossible. In order to avoid such deformation, it becomes important to make this device sufficiently rigid to avoid such deformation. However, when the device is made heavier, to enhance rigidity, the device also becomes difficult, or impossible, to handle for manual installation.

Second, the present inventor has discovered that the attachment pressure of the cleats to the tread surface of the wheel should preferably be maintained sufficient against the wheel, especially when the claw is located in the zone of contact between the wheel and the ground surface in which the wheel is usually compressed (see, e.g., FIG. 2). The distance from the surface of the wheel to its center axis usually decreases significantly in this zone. However, where individual springs are arranged to axially compress, such as in U.S. Pat. No. 4,089,359 (No. (2) above) (see also, U.S. Pat. Nos. (a) 2,477,051, (b) 2,601,882, (c) 3,016,079, (d) 3,996,984 and (e) 4,089,359), the pressure exerted by the individual springs falls sharply as the cleats move inward. Accordingly, the pressure exerted can decrease too great, so as to potentially make the device ineffectual.

Third, many of the devices known can not be used universally. That is, the devices are limited to applicability to only certain wheels having specified size, type, construction, or the like. As illustrated in, for example, the above U.S. Patents (a)–(e), some devices are attached to the wheel's hub, or hubcap. However, as should be apparent, there is a great variety of hub cap styles, etc., rendering such devices rather limited in universal applicability.

SUMMARY OF THE INVENTION

Therefore, a primary object of this invention is to provide a vehicle wheel anti-slip device which is of superior quality to the devices previously known.

Another object of this invention is to provide a durable and reliable anti-slip device.

Another object of this invention is to provide a strong, high quality anti-slip device which accommodates variations in tire diameter due to compression against a road surface.

Another object of this invention is to provide an economical anti-slip device.

Another object of this invention is to provide an anti-slip device which is universally applicable to a variety of wheels.

Another object of this invention is to provide a very easy to install and use anti-slip device.

Another object of this invention is to provide a very easy to install anti-slip device due to, in part, the light weight of the device, e.g. due to, for example, the light weight of the device being below about 10 lbs., preferably 8 lbs. or less.

The above and other objects are achieved in accordance with the present invention, in which: a vehicle wheel anti-slip device is provided, comprising: a generally rigid frame positionable on a front surface of a vehicle wheel; a plurality of support brackets pivotally mounted to the frame, the support brackets pivoting around axes which are generally parallel to the front surface of the vehicle wheel when mounted on the vehicle wheel; a respective claw mounted to each of the support brackets, the claws being constructed so as to extend over at least a portion of a perimeter surface of the vehicle wheel when mounted thereon; and a tension force device which biases the plurality of claws generally towards a center axis of the vehicle wheel; whereby when the device is mounted to a vehicle wheel the claws are movable generally along a radius inward towards the center axis of the vehicle wheel when rotated into a contact zone of the vehicle wheel with a ground surface during According to another aspect of the invention, the device includes that each of the claws is pivotally attached to the support brackets.

According to another aspect of the invention, the device includes that each of the claws pivots around an axis which is generally parallel to an axis around which the respective support bracket pivots on the frame.

According to another aspect of the invention, the device includes that the tension force device is connected to each of the support brackets and biases the claws by applying a tension force upon the support brackets.

According to another aspect of the invention, the device includes that the tension force device includes at least one tension spring.

According to another aspect of the invention, the device includes that the tension device has means to apply a tension force simultaneously to each of the claws.

According to another aspect of the invention, the device includes that the means to apply a tension force simultaneously includes chords which are slidably attached to the support brackets.

According to another aspect of the invention, the device includes a respective tension member connecting each of the support brackets with a respective one of the claws such that the claws are biased so as to pivot in a direction towards the center axis when mounted upon the vehicle wheel.

According to another aspect of the invention, the device includes a respective stop member which limits the pivotal movement of the claws with respect to the respective support bracket, and that the tension members are tension springs.

According to another aspect of the invention, the device includes at least one flexible tire contact member attached to the claws and engagable with the sides of the The present invention, therefore, has significant advantages, including, for example, that (1) it is very durable and reliable, (2) it can be very easily installed, and (3) it can have universal applicability to various wheels.

Durability And Reliability

The present invention provides very great reliability. For example, the arrangement of the cleats, or claws, is, in the preferred construction, formed to allow a generally plane-parallel movement (e.g. maintained generally parallel to the wheel center axis) of the claw in the zone of ground/wheel contact without significantly lessening its attachment pressure against the tread surface of the tire (see, e.g., elements 2', 2", 2/5, 5', 8, 9, 10, 11 and 16 in the preferred embodiment discussed below).

Further, the use of elastic and springy tire contact portions (see, e.g., 16 in the preferred embodiment discussed below) which press against the wheel sides help to prevent damage of the claws due to outward expansion of the wheel width and/or lateral movement of the wheel in the zone of ground/wheel contact, while maintaining an enhanced fit to the wheel.

Further, the preferred manner of constructing the tension force device which biases the plurality of claws generally towards the center axis is made such that the pressure of the claws against the wheel is maintained sufficient against the wheel, especially when the claw is located in the zone of contact between the wheel and the ground surface. In the preferred construction, the claws are each simultaneously biased by a limited number of springs in such a manner that the attachment pressure of each of the respective claws is maintained substantially constant. In the preferred construction, the claws are each interconnected in such a manner that the inward movement of a single claw will not significantly affect the pressure of that claw (nor the other claws) against the tread surface of the wheel. For instance, by interconnecting each of the claws, respectively, to link portions which are connected together via spring biased chords, the pressure can be kept substantially constant even during inward pressure of the claws. It is noted that the proper pressure between the claws and the tire surface is important for a number of reasons. For example, when the device is mounted upon the wheel and the wheel is attempted to be rotated on a snow covered surface, the rotational movement of the wheel (i.e. the rotational moment of the wheel at the wheel perimeter) needs to impart forward movement to the vehicle via the claws. Therefore, rotational movement of the wheel upon the slippery snow should not merely force the claw to slide over the wheel tread surface.

Furthermore, in contrast to the above-noted axially slided cleats, the present device can better accommodate warping or the like so as to maintain functionability. For instance, the claws can still move easily when the claws, links, etc. are somewhat deformed. In particular, it is noted that the axles of the claws hinges, in the preferred construction, can be easily maintained structurally intact, e.g. since the lead on the axle is generally parallel to its axis, thereby ensuring that the hinges will always turn and function properly, even with a possible deformation of the claw or the link portion.

Easy Installation

According to the preferred construction of the device, it can be easily installed. For example, the device can be made to weigh about 8 lbs. when made from ordinary steel, and sized to fit a normal automobile wheel. When the device is constructed with light weight materials, it can be made even lesser in weight. As a result, the device can be easily managed and manipulated in installation by most users.

In addition, according to the most preferred embodiments, the present device contemplates having all of the claws simultaneously released from contraction so as to be extended and/or simultaneously contracted. Preferably, a single clamp, clip, or the like, is connected and/or disconnected to alternate between retracted and/or extended states of the claws to facilitate operation and manageability of installation.

Universal Applicability

The preferred construction of the present device is applicable to a variety of wheels of differing diameters and widths.

For example, the overall dimensions of the base frame can be made less than a certain minimum wheel size, and when the device is installed, all of the claws can either meet closer together to the center or diverge further apart from the center, depending on the diameter of the wheel. Under these circumstances, the preferred construction of the device can maintain a proper pressure fit on a wide range of wheel diameters because the pressure of the claws can be made so as not to vary too greatly between various wheel sizes. The functional schematic doesn't need to substantially change.

Other Advantages

In view of the above aspects and other aspects such as in the discussion of the preferred embodiments below, the device also has other notable advantages, including, for example, that (a) it can be easily manufactured, (b) it can have a limited number of parts, (c) it can be economically made, (d) it can be firmly maintained upon the vehicle wheel during use, (e) it can be long lasting and dependable, and (f) it can provide very good traction during use in inclement weather such as on snow, ice, slush, etc.

Further, all of the parts, except for springs, flexible parts, etc., can be made from ordinary steel, with no need for special processing. The invention can be made with simple drilling, cutting, bending and welding. In addition, the springs and flexible parts can be made with standard parts.

The above and other (i) objects, (ii) advantages, (iii) features and (iv) aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

Figure 2:
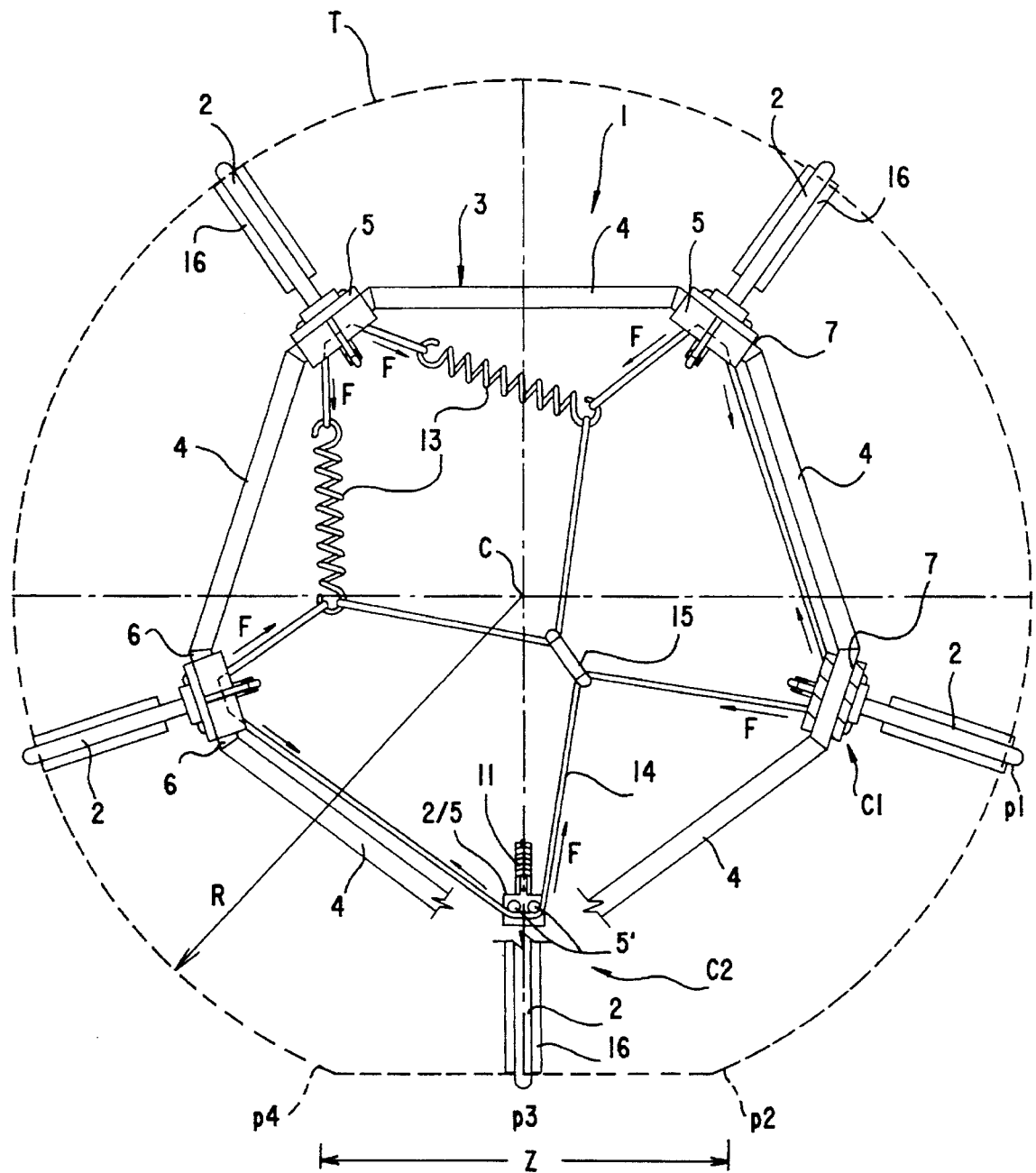
FIG. 2 is a side view of the embodiment shown in FIG. 1 showing the device in a working position.
Figure 3:
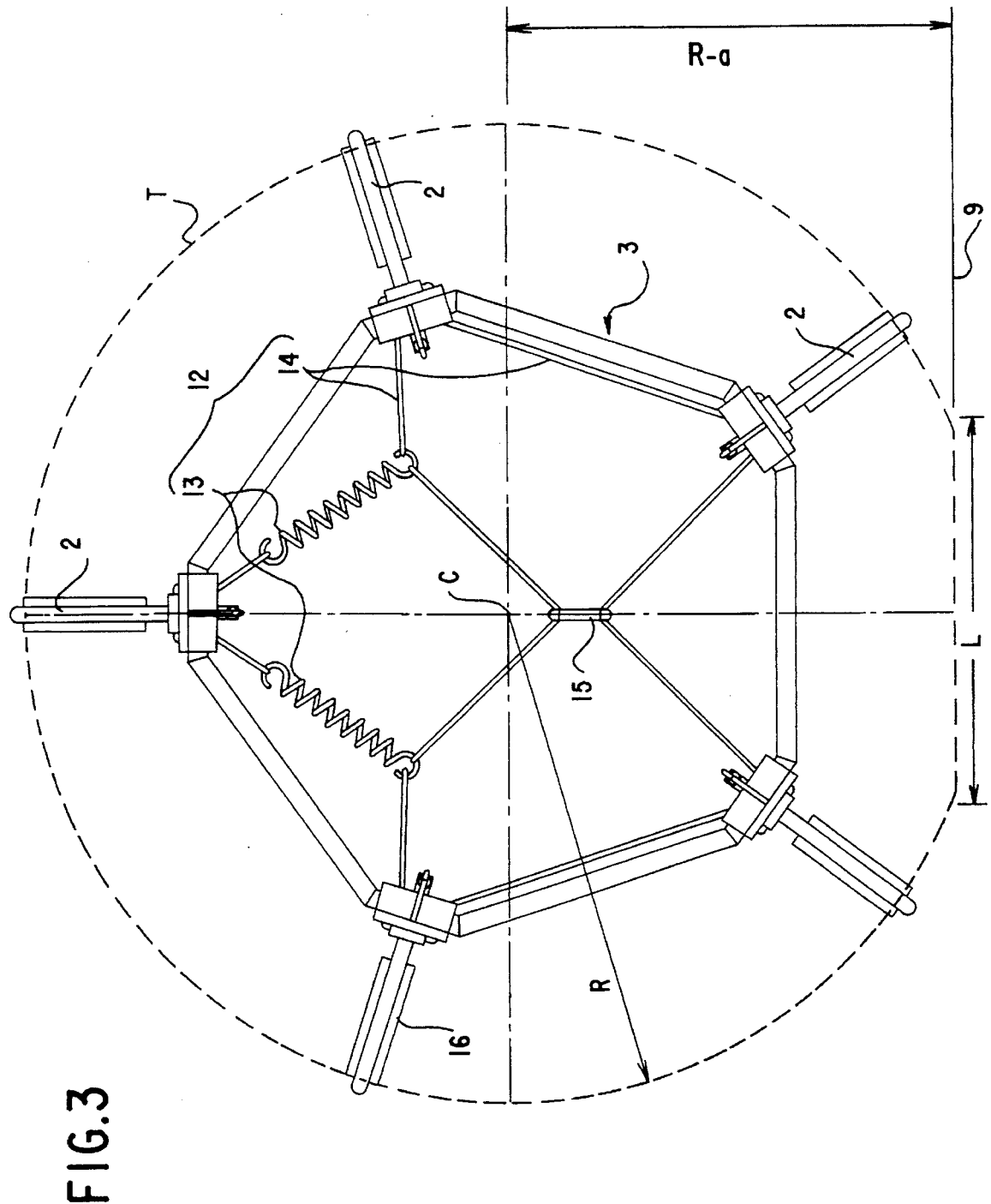
FIG. 3 is a side view of the embodiment shown in FIG. 1 showing the device in an installing position.
Figure 4:
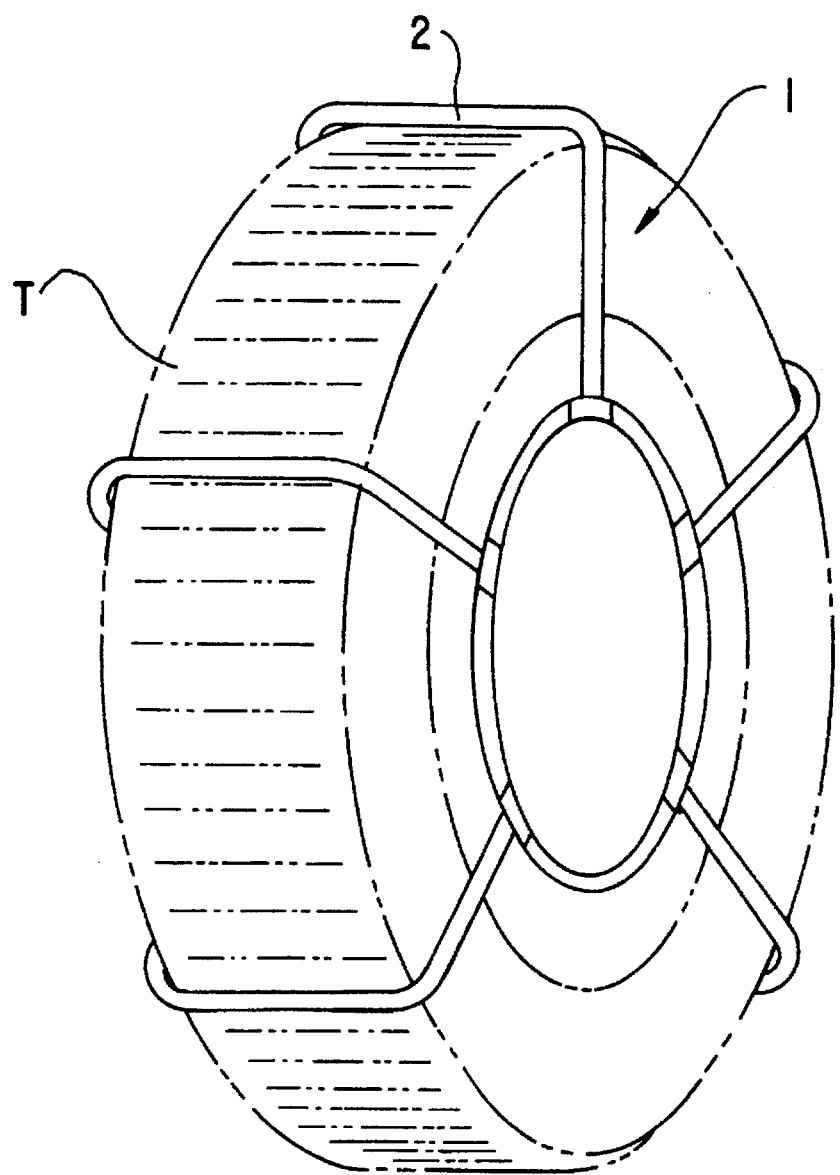
FIG. 4 is a perspective view showing the general arrangement of the device upon a vehicle wheel.

As shown in FIG. 4, the present invention contemplates a spider-like device 1 having a plurality of claws 2 which surround a wheel/tire T in order to provide an enhanced friction contact with a road surface. As the wheel T is rotated during use, the respective claws contact the road surface, whereby engaging with ice, snow or the like. FIG. 4 shows a general concept. More specific features of the preferred embodiment are shown in FIGS. 1–3, discussed below.

Figure 1:
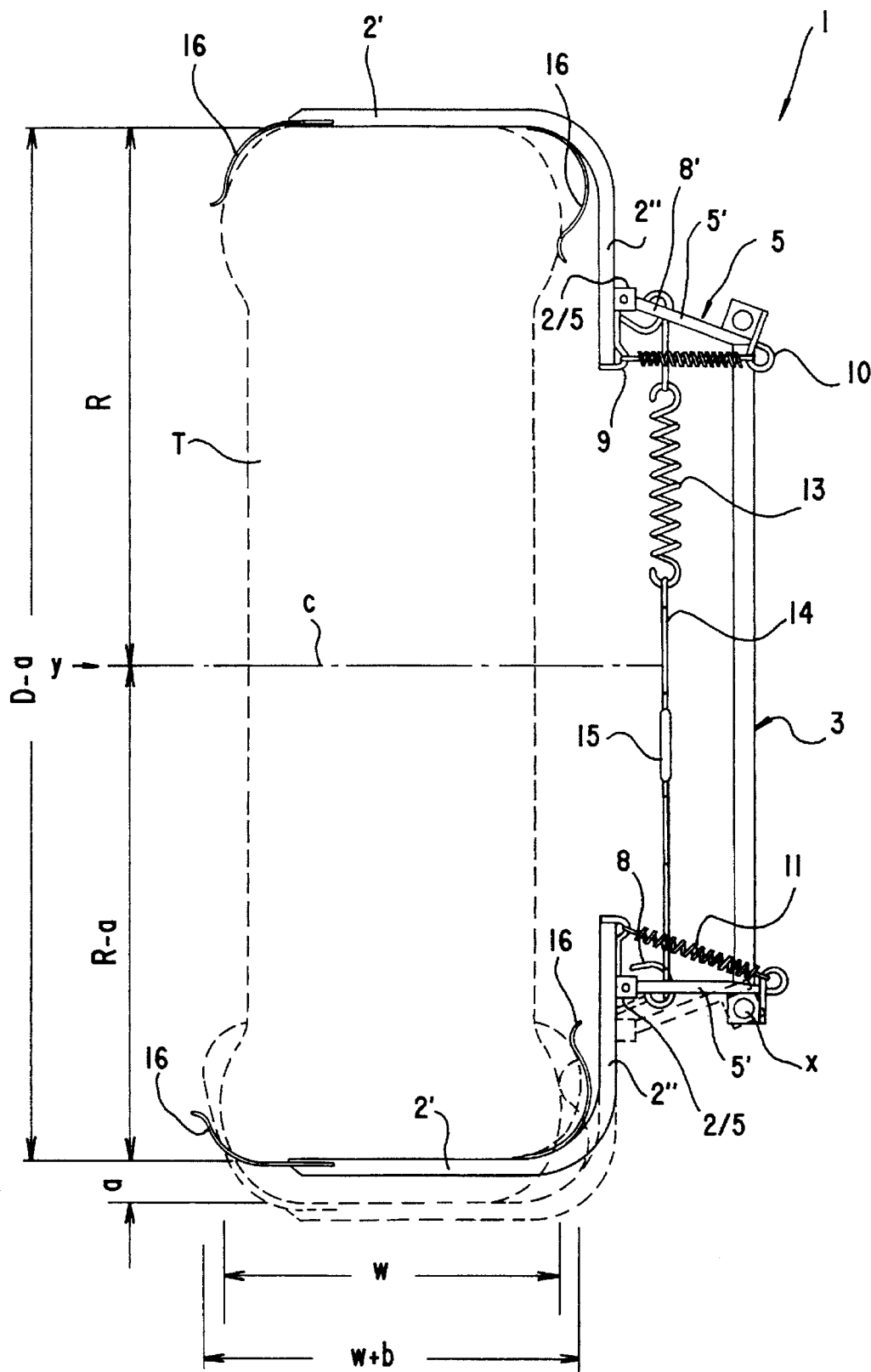
FIG. 1 is a front view of a first embodiment of the invention.

As shown in FIG. 1, the device includes a frame 3. The frame 3 is preferably a generally rigid structure. As illustrated in FIGS. 2–3, the frame 3 includes a plurality of generally rigid connecting members 4 which are linked together end to end. As illustrated, the connecting members 4 are preferably equal length and connected together so as to form a polygon shape.

Alternatively, the frame 3 can be made to be adjustable in size. For instance, the connecting members 4 can be made extendable, such as with the provision of a common double threaded connecting member in the middle of each connecting member.

The connecting members are preferably generally cylindrical, but can also be made so as to have a square, or other suitable shape cross section. As shown, preferably, connecting portions 6 are formed at the ends of the connecting members 4 and fit within a bore 7, FIG. 2, of the support brackets 5. The bore 7 is most clearly shown in FIG. 2, which shows a partial sectional view of the bracket 5 at the area C1. As also shown in FIGS. 1–3, the support brackets 5 are located at a plurality of positions around the frame 3. The connecting portions 6 can, in a most preferred embodiment, be formed with a single beam which is connected at opposite ends to the connecting members 4. In this manner, the connecting members 4 and the connecting portions 6 can together provide a generally rigid, closed, frame structure.

As shown in FIG. 1, the support brackets 5 are pivotally supported on the connecting portions 6. As also shown in FIG. 1, the support brackets 5 include a connecting link portion 5' which is pivotable around the axis x passing through the connecting portion 6. The link portion 5' is pivotally connected at its inner end to a respective claw 2 via pivot connection 2/5. The pivot connection can be formed with a bracket extending from the claw which is rotatably engaged with a shaft, or axle, connected to the end of the link portion 5'.

A claw spring end mount 9 is attached to each claw 2. Preferably, the claw spring end mount 9 is located at a point on the claw 2 nearer the center axis y of the wheel T. A support bracket spring end mount 10 is attached to the support bracket 5. A tension member, preferably a tension spring 11 is connected between the claw spring end mount 9 and the support bracket spring end mount 10. The tension spring 11 biases the claw 2 to rotate about the pivot connection 2/5 so that the claw 2 is biased against the wheel perimeter, e.g. so as to bias the claw shown at the top of FIG. 1 counterclockwise.

As further shown in FIG. 1, a stop member 8 is fixedly connected to the link portion 5'. The stop member 8 limits the rotational movement of the claw with respect to the link portion 5'. Preferably, the stop member 8 maintains the contact leg of the claw 2' at a position generally parallel to the axis y under normal conditions.

As also shown in FIGS. 2–3, the claws 2 are biased inwardly towards the center C via a tension force mechanism 12. The tension force mechanism preferably includes an arrangement of springs 13 and connecting cables, chords, 14. As shown in FIGS. 1–2, the tension force mechanism 12 preferably grapples all of the link portions 5' at a location so as to draw the claws 2 inward towards the center C. Preferably, as shown, the tension force mechanism 12 attaches to the link portions as shown, but although less preferred, it could be attached to the claws 2 themselves, such as at side leg portions 2". The tension force mechanism 12 should provide a force sufficient to maintain the spider-like device 1 firmly against the wheel T.

As shown in FIG. 1, the preferred construction involves having the chords 14 slide over the link portions 5'. In this manner, the chords pull on the links while still sliding thereover. Thus, the chords 14 pass over, or relative to, the link portions 5' while still providing a pulling force. Although not always necessary, means for keeping the chords 14 at locations over the respective links can be provided, e.g. to generally maintain the chords a distance from the axis x. FIG. 1 shows an example including a curved portion 8' under which the chords pass—the curved portion 8' can be formed integrally with the stop member 8.

As shown in FIG. 2, which illustrates a partial sectional view at the lower area C2, in one preferred embodiment, the link portion 5' can comprise two generally parallel rods having a generally circular cross section around which the chords 14 can freely slide.

Although the Figs. show a preferred arrangement for the tension force device 12, it should be understood that other arrangements of springs, flexible elastic chords, etc., could be used, as long as an inward tension force(s) F are applied to each of the claws so as to bias them against the wheel T. Nevertheless, the illustrated embodiment is preferred because, among other benefits, it is easy and cost effective to assembly and it firmly maintains the device 1 on a wheel. In addition, as shown, in the preferred .embodiment, two tension springs 13 can provide an inward force on each of the claws 2. As also illustrated, a clasp 15 is provided which arranges the chords 14 so that the tension force is directed towards the center C to enhance the functioning of the device 12. The clasp 15 can be made a variety of ways, e.g. as long as it is releasable and attachable to the chords 14.

As best shown in FIG. 1, the present invention also contemplates the use of a tire contact portion/portions 16. The tire contact portions 16 are preferably resilient and bent as illustrated so as to snugly hold to the perimeter edge of the wheel T. If desired, the tire contact portions 16 can also have a wider width than the claws and be located, e.g. beneath the claws, so as to help protect the wheel from inward pressure by the claws 2 when the claws contact the ground or road surface. Although it is preferred to include tire contact portions 16 because, among other benefits, the tire contact portions 16 enhance the stability of the device and provide an easier fittability, the present invention contemplates that such portions can be omitted, or, alternatively, can be formed integrally with the claws.

In the illustrated preferred embodiment, the device includes five support brackets and respective claws 2 distributed generally evenly around the wheel surface, whereby a generally pentagon shape frame 3 is provided. Although using five claws 2 has been found to provide good stability, mountability (see discussion below regarding installing), and good traction result, the present invention also contemplates that the number of claws 2 can be varied, as examples, there could be three claws, four claws or even more, or possibly, though less preferably, fewer. It should be understood that if less than three claws are used, the device would not be as easily maintained upon the vehicle wheel T. In addition, although it is preferable to arrange the claws evenly to provide, among other benefits, a more constant contact with the road surface, easy mountability, and aesthetic appeal of the device, there could be a number of claws distributed at unequal intervals around the wheel.

Installation

Reference is made to FIG. 3, which illustrates the install position, i.e. the position of the wheel T with respect to the spider-like anti slip device 1 of a preferred embodiment of the invention when the device is installed upon the wheel T. In the preferred embodiments, as shown, the distance between at least two adjacent claws is sufficiently larger than the ground contact length L shown at the bottom of FIG. 3. As a result, when the device is installed upon a vehicle wheel T, the device can be placed upon the wheel without lifting or raising the wheel off of the ground surface g, FIG. 3.

Specifically, to mount the device, the tension force device 12 is released such that the inward tension force is fully released, or at least substantially reduced, such that the claws 2 can be pivoted outwardly around the wheel until each of the claws 2 straddles the wheel such as shown in FIG. 1. In order to release the tension force sufficient to mount the device, one can remove the clasp 15 and/or remove one or more of the springs 13.

When the device is properly mounted on the wheel 2, the tension force device 12 presses the claws 2 against the tire surface. In this mounted position, the claws are each pressed against the stops 8 due to the tension of the springs 11, and the tire contact portions 16 snugly grip the perimeter of the wheel.

According to the preferred construction of the invention, the device can be applied to a variety of wheels/tires of various sizes. It should be apparent that the outward/inward flexibility of the claws 2 away/towards the center C enables the device to be easily fitted upon wheels ranging in diameter, i.e. diameter D of FIG. 1. In addition, the structure of the claws 2 and also the tire contact portions 16 facilitates appropriate placement of the device upon wheels ranging in width, i.e. width w of FIG. 1.

Although the anti-slip device 1 according to the most preferred construction of the invention is capable of being very easily placed upon a vehicle wheel and, accordingly, in a similar manner, easily removed from a vehicle wheel, it is also contemplated that, in a less preferred embodiment of the invention, the device could be permanently mounted upon a vehicle wheel. Similarly, although no additional clamps, bolts, etc. are required to maintain the device 1 upon the vehicle wheel in the preferred embodiments, in a less preferred embodiment, the device could be so attached to the vehicle wheel, such as to the hub, hub cap, etc.

Operation

Reference is made to FIG. 2, which illustrates the work position of the device, i.e. the position of the wheel T with respect to the spider-like anti slip device 1 of a preferred embodiment of the invention when a respective claw contacts the ground surface. As best shown in FIG. 2, while the wheel T rotates, i.e. is rolled, during use, each of the claws 2 is alternately rotated along with the wheel T such as to come in the zone of contact between the wheel T and the road, or ground, g.

Due to the flexibility of most wheels/tires, the zone of contact during use is represented by a generally flat portion at the bottom of the wheel T, e.g. corresponding to the length L shown in FIG. 3.

When the tire is rotated in a direction clockwise in FIG. 2, the claws 2 are initially located such that the legs 2' are located a distance R from the center C, i.e. see position p1 in FIG. 2. When a claw 2 reaches the position p2, the radius of the wheel perimeter on which the claw 2 is held is decreased until the position p3, then the radius increases to the position p4 where it becomes the normal radius R again.

Accordingly, the present device operates so as to maintain the claws 2 firmly on the wheel T and to smoothly operate even as the claws 2 rotate through the zone z during use.

As illustrated in FIG. 1, when a claw reaches the point p3, the radius is equal to an amount R−a. Where a is the amount which the tire is compressed at the bottom thereof due to the weight of the vehicle which creates a downward force upon the wheel T against the ground g, pressing the wheel T against the ground.

As also illustrated in FIG. 1, when the wheel is rotated, the wheel also expands in a widthwise direction in the contact zone z. Accordingly, the normal width w is expanded to a width w+b at the position p3. Thus, the provision of the flexibility in the tire contact portions 16 enable the device to be smoothly and properly maintained upon the wheel T even as the width continually expands and contracts during use.

As also illustrated in FIG. 1, when the wheel is rotated from position p1 to position p3, the link 5' is pivoted from the position shown in dotted lines to the position shown in solid lines. During this movement, the tension force device 12 continues to provide an inward biasing force towards the center axis C, such that the claw 2 is held against the wheel T. In addition; the tension spring 11 also applies a biasing force upon the claw 2 so that the claws are properly maintained and located. Accordingly, the claws 2 can, preferably, be maintained such that the legs 2' are located generally parallel to the center axis C even as the claw 2 passes through the zone z, e.g. as illustrated in FIG. 1, the center axis C is generally parallel to both the dotted line showing and the solid line showing of the leg 2'.

The claws 2 facilitate driving on ice covered, and especially snow covered ground surface. To this end, the leg portions 2' are sized a sufficient height and width so as to extend outward from the vehicle wheel to engage and/or penetrate with snow, ice or the like. The claw legs 2' are preferably beam-like members, which due to their somewhat narrow width and protruding height from the tire perimeter surface provide a good road contact, while maintaining a low cost and easy to produce and maintain design. The legs can be formed with a generally rounded ground contact surface as illustrated in FIGS. 2 and 3. To this end the legs 2' can be generally cylindrically formed. Among other things, such a design could help prevent sharp corners from damaging road surfaces, and or the wheels themselves. Nevertheless, the present invention also contemplates that the claws could be made with other cross-sectional shapes, such as shapes having edges which could enhance ground engagement, such as square, rectangular, triangular, etc. In addition, the claws could be adapted with groves, blades, studs, etc., to further enhance ground engaging contact. In a preferred construction of the device, the claws, and also the frame and support brackets should be made of a durable material, such as metal, or the like.

Accordingly, as presented above, the present device has many advantages and benefits. For example, (a) it is easy to manufacture, (b) it has a limited number of parts, (c) it can easily be applied to a vehicle wheel, e.g. without lifting the wheel, etc., (d) it can be applied to vehicle wheels ranging in size, (e) it is firmly maintained upon the vehicle wheel during use, (f) it is long lasting and dependable, and (g) it provides very good traction during use in inclement weather such as on snow, ice, slush, etc.

While the instant invention has been shown and described with specific reference to embodiments presently contemplated as the best mode of carrying out the invention in actual practice, it is understood that various changes may be made in adapting the invention to different embodiments without departing from the broader inventive concepts disclosed herein and comprehended by the claims which follow.

I claim:

1. A vehicle wheel anti-slip device, comprising:

a generally rigid frame positionable on a front surface of a vehicle wheel;

a plurality of support brackets pivotally mounted to said frame, said support brackets pivoting around axes which are generally parallel to the front surface of the vehicle wheel generally perpendicular to the radial direction of the wheel, when mounted on the vehicle wheel;

a respective claw mounted to each of said support brackets, said claws being constructed so as to extend over at least a portion of a perimeter surface of the vehicle wheel when mounted thereon; and a tension force device which biases said plurality of claws generally towards a center axis of the vehicle wheel;

whereby when said device is mounted to a vehicle wheel the claws are movable generally along a radius inward towards the center axis of the vehicle wheel when rotated into a contact zone of the vehicle wheel with a ground surface during use.

2. The vehicle wheel anti-slip device of claim 1, wherein each of said claws is pivotally attached to the support brackets.

3. The vehicle wheel anti-slip device of claim 2, wherein each of said claws pivots around an axis which is generally parallel to an axis around which the respective support bracket pivots on said frame.

4. The vehicle wheel anti-slip device of claim 3, wherein there are at least three support brackets and at least three claws.

5. The vehicle wheel anti-slip device of claim 1, wherein said tension force device is connected to each of said support brackets and biases said claws by applying a tension force upon said support brackets.

6. The vehicle wheel anti-slip device of claim 5, wherein said tension force device includes at least one tension spring.

7. The vehicle wheel anti-slip device of claim 6, wherein said tension force device includes chords which are connected to said support brackets and operatively connected to said at least one tension spring.

8. The vehicle wheel anti-slip device of claim 7, wherein said chords grapple link portions of each of said support brackets.

9. The vehicle wheel anti-slip device of claim 1, wherein said tension device has means to apply a tension force simultaneously to each of said claws.

10. The vehicle wheel anti-slip device of claim 1, wherein said means to apply a tension force simultaneously includes chords which are slidably connected to said support brackets.

11. The vehicle wheel anti-slip device of claim 3, further including a respective tension member connecting each of said support brackets with a respective one of said claws such that said claws are biased so as to pivot in a direction towards said center axis when mounted upon the vehicle wheel.

12. The vehicle wheel anti-slip device of claim 11, wherein a respective stop member limits the pivotal movement of the claws with respect to the respective support bracket.

13. The vehicle wheel anti-slip device of claim 11, wherein said tension members are tension springs.

14. The vehicle wheel anti-slip device of claim 1, further comprising at least one flexible tire contact member attached to said claws and engagable with the sides of the tire opposite the side on which the anti-slip device is mounted.

15. The vehicle wheel anti-slip device of claim 1, further comprising said frame having a generally rigid polygonal shape;

said claws including a first leg portion locatable over the perimeter of the vehicle wheel and a second leg portion at an angle to said first leg portion and locatable over the front surface of the vehicle wheel;

said claws each being pivotally mounted to a respective one of said support brackets;

wherein there are at least three support brackets and at least three claws;

said tension force device being connected to each of said support brackets and biasing said claws by applying a tension force upon said support brackets, said tension force device including at least one tension spring; and a respective tension member connecting each of said support brackets with a respective one of said claws on said second leg portions such that said claws are biased so as to pivot in a direction towards said center axis when mounted upon the vehicle wheel.

* * * * *